Dec. 26, 1922.

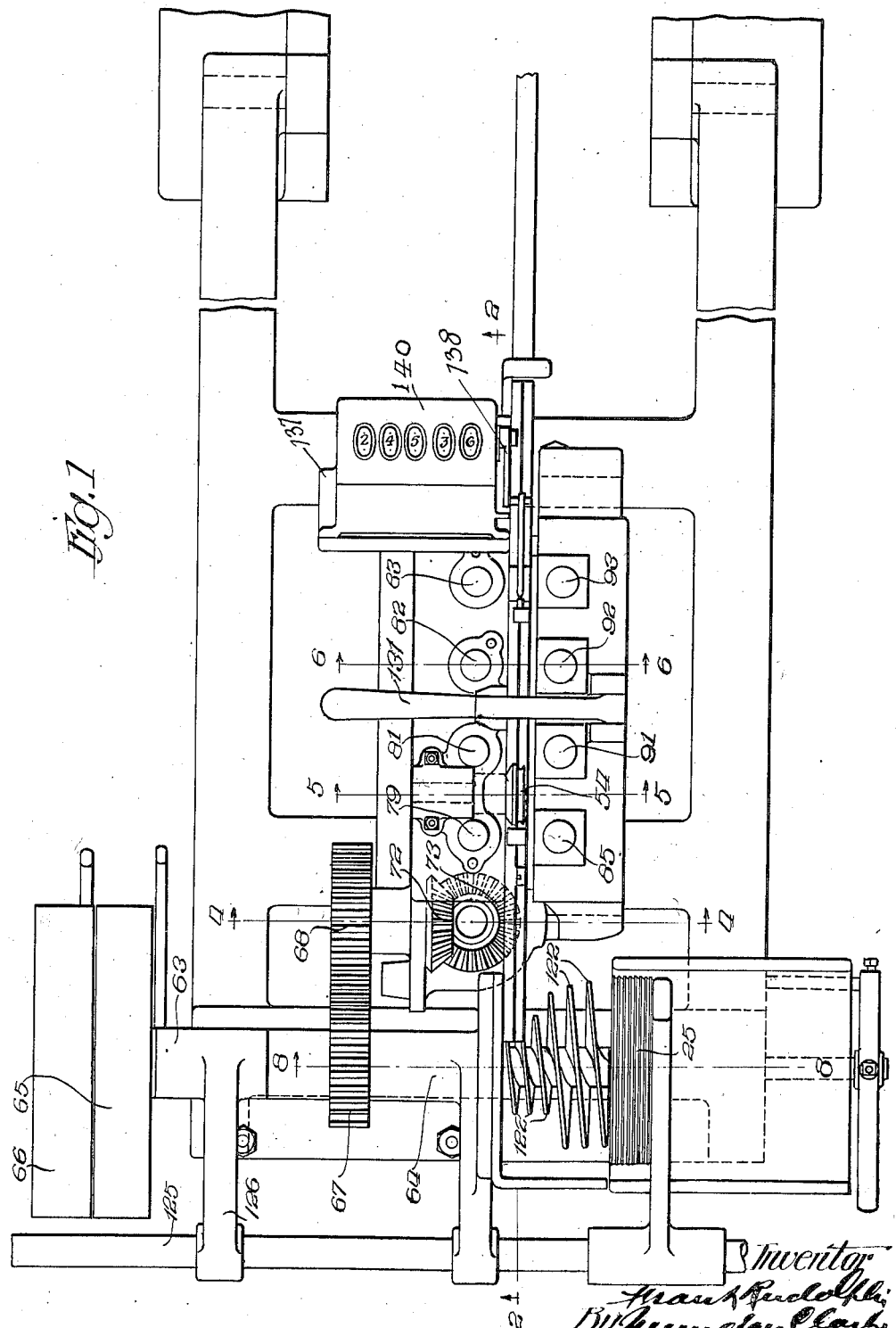

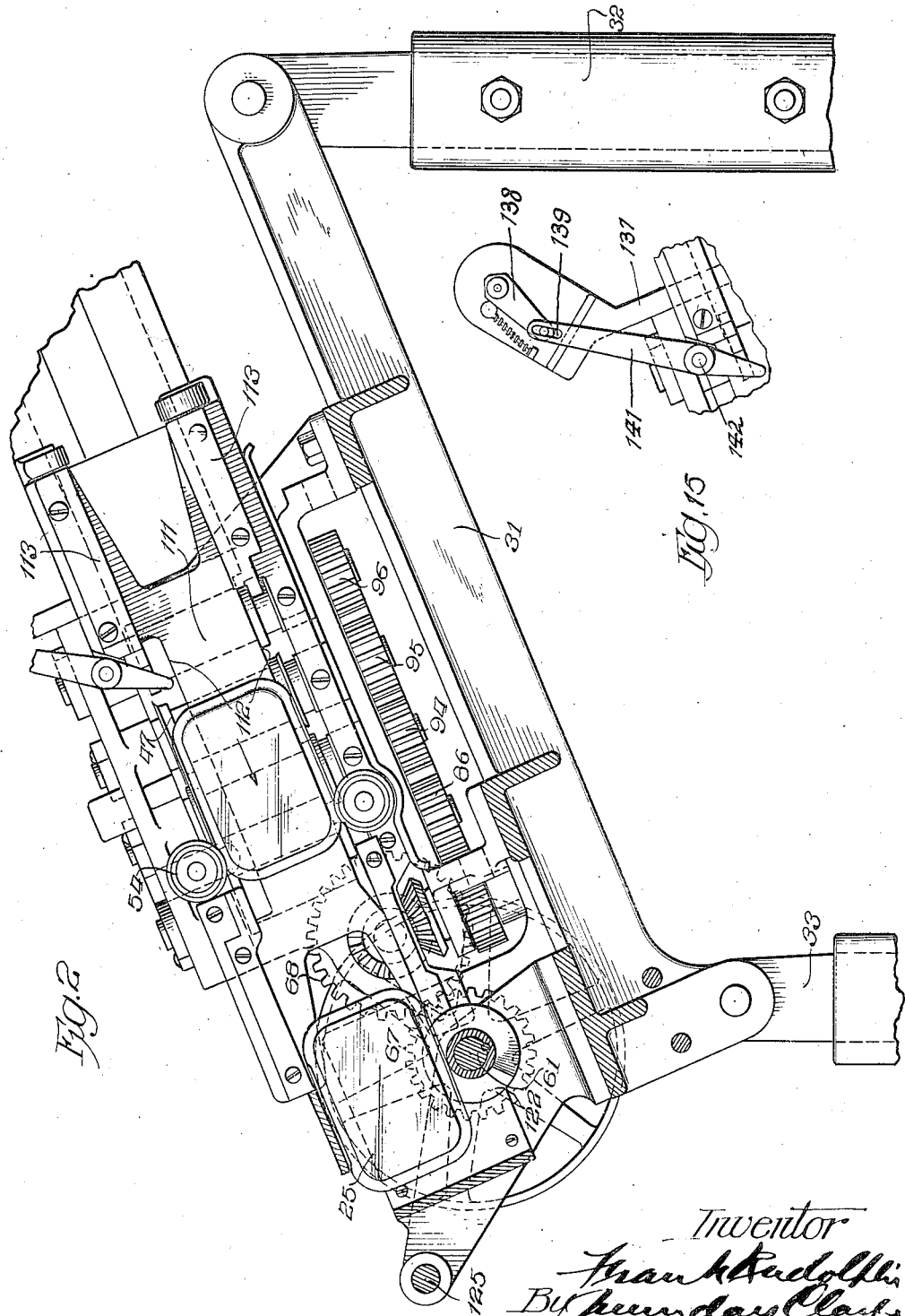

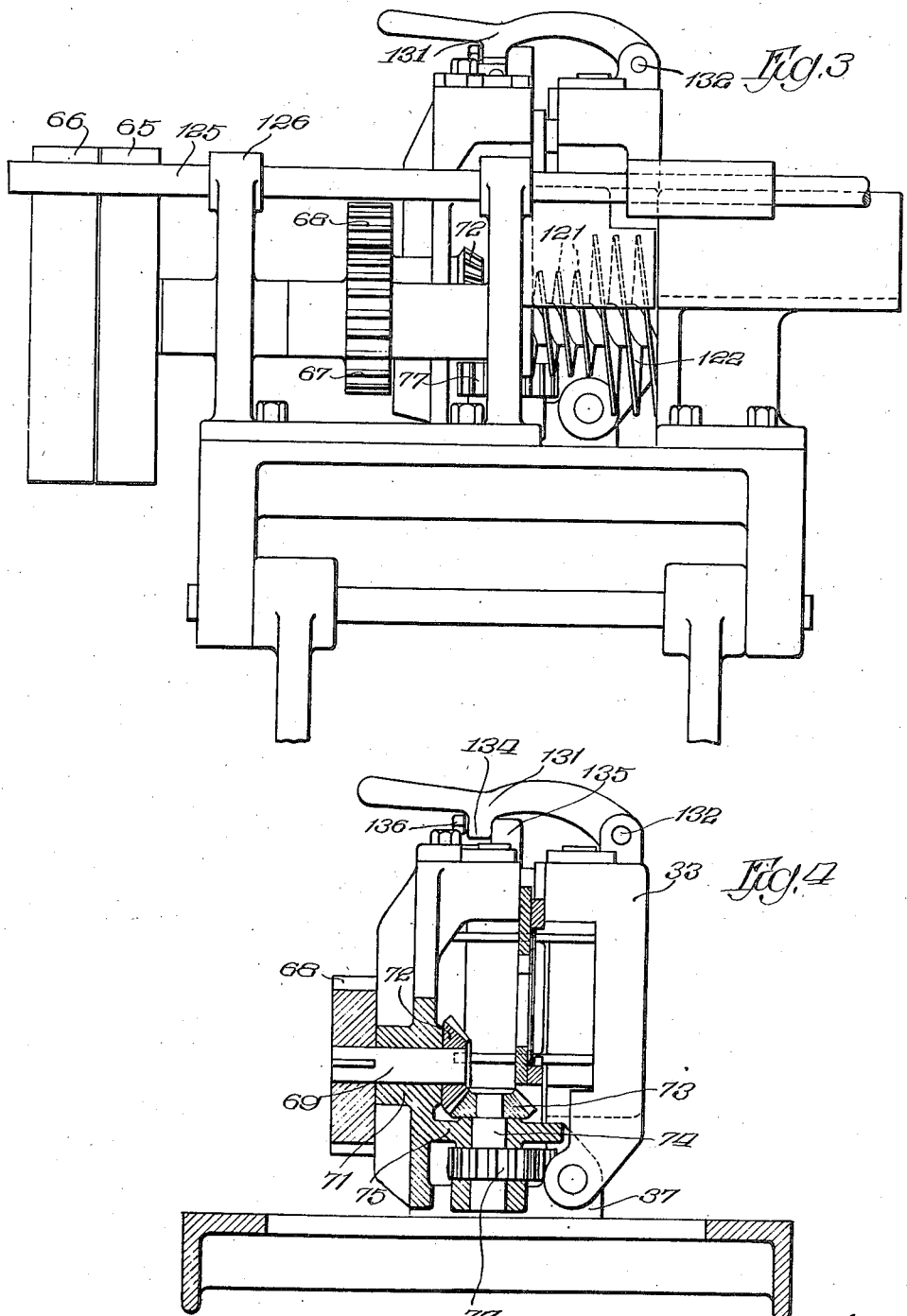

F. RUDOLPHI.
FLANGE CURLING AND COUNTING MACHINE.
FILED AUG. 6, 1919.

Inventor
Frank Rudolphi
By Munday, Clark
& Carpenter Attys

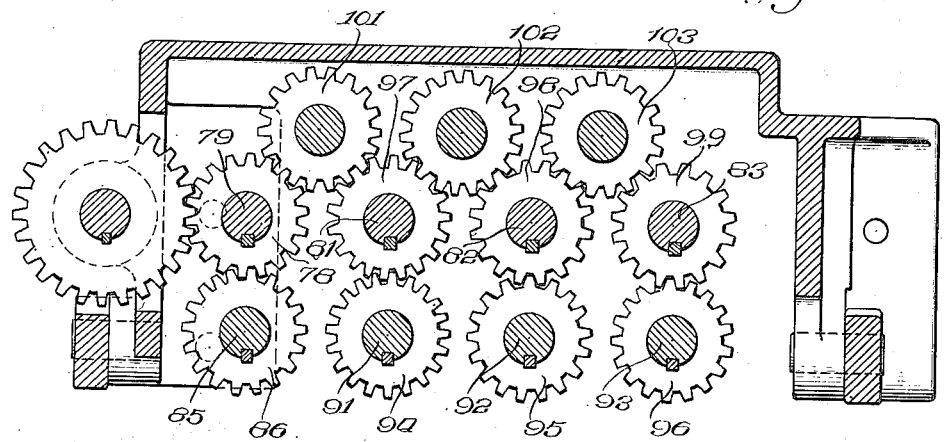
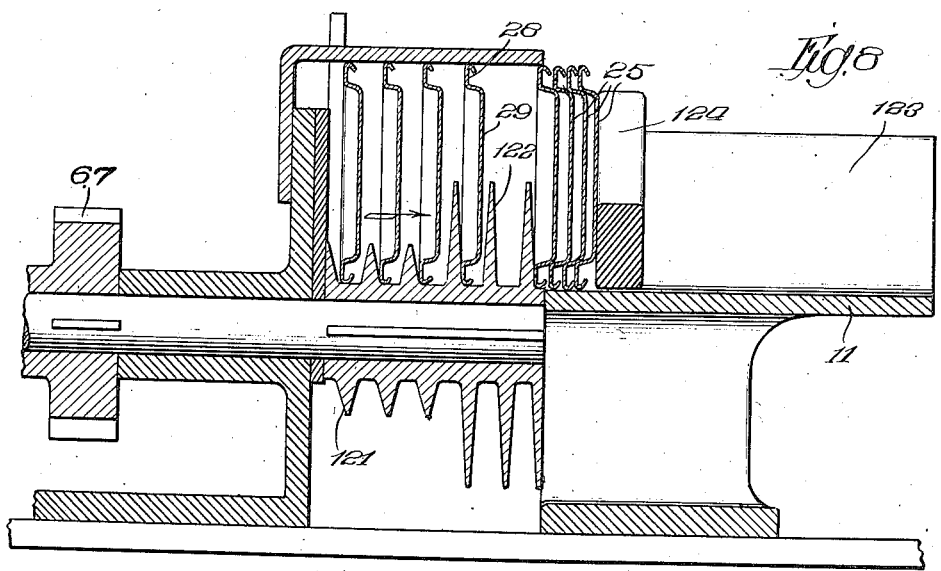
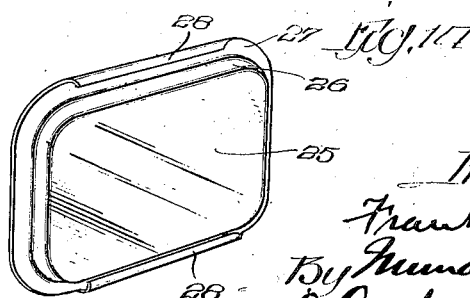

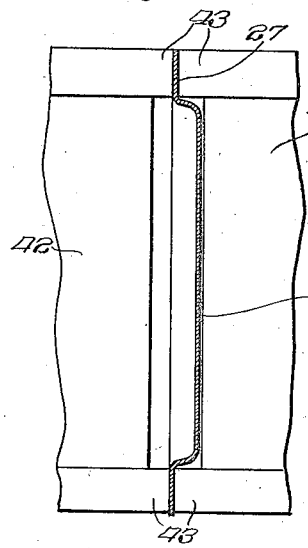
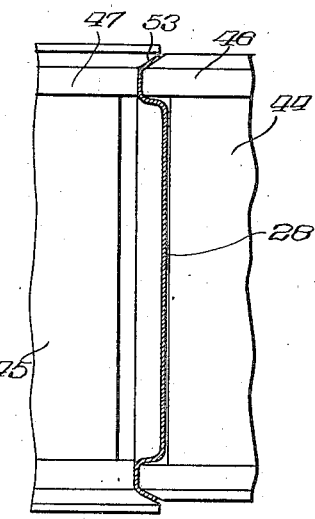
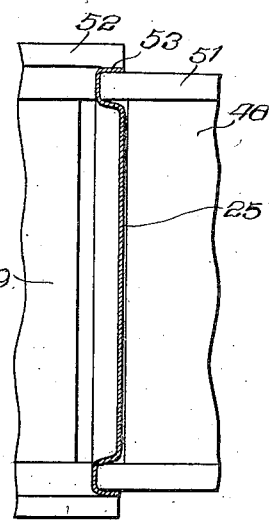
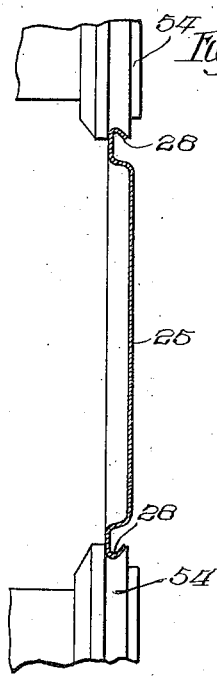
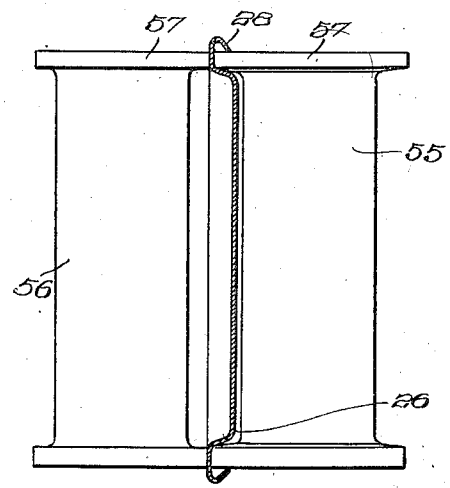

Patented Dec. 26, 1922.

1,440,179

UNITED STATES PATENT OFFICE.

FRANK RUDOLPHI, OF NEW YORK, N. Y., ASSIGNOR TO AMERICAN CAN COMPANY, OF NEW YORK, N. Y., A CORPORATION OF NEW JERSEY.

FLANGE CURLING AND COUNTING MACHINE.

Application filed August 6, 1919. Serial No. 315,611.

*To all whom it may concern:*

Be it known that I, FRANK RUDOLPHI, a citizen of the United States, residing in New York, in the county of New York and State of New York, have invented a new and useful Improvement in Flange Curling and Counting Machines, of which the following is a specification.

This machine relates to machines for performing operations in the formation of can ends, and more particularly machines performing such operations while the can ends are moving therethrough with a substantially continuous motion. The invention has for an important object the inclusion within a machine for performing a final operation on the can end, as for example, curling the flanges or gauging them, or both, of a stacking mechanism for stacking the ends operated upon and a counting device or mechanism adapted to count the ends as they are operated upon, that is to say, to count them while they are passing through the mechanisms.

A further object of the invention is the provision of a machine for curling the edges of rectangular can ends, having a counting mechanism conveniently arranged and located so that it will not interfere with the feeding of the can ends to the machine or their delivery therefrom.

Another important object of the invention is the provision in a machine through which can ends are advanced by the action of the forming members of a counting mechanism for counting the can ends while moving under the directing force of such forming mechanism.

Another highly important object of the invention is the provision of a stacking mechanism so constructed and arranged with respect to the other operating parts of the machine that it will automatically receive the can ends and arrange them in stack formation.

Although the invention is hereinafter described in connection with a machine for curling and gauging the curls formed on rectangular flange can ends, it will be manifest that certain features of the invention render it usable in apparatus of other forms and for other purposes.

Numerous other objects and advantages of the invention will be apparent as the invention is better understood from the following description, which when taken in connection with the accompanying drawings illustrates a preferred embodiment thereof.

Referring to the drawings,

Figure 1 is a top plan view of an apparatus embodying my present invention;

Fig. 2 is a section taken substantially on a line 2—2 of Fig. 1;

Fig. 3 is an end view of the same, a part of the base being broken away;

Fig. 4 is a section taken on the line 4—4 Fig. 1;

Fig. 7 is a section taken through the gear box;

Fig. 8 is a section taken on the line 8—8 of Fig. 1;

Figs. 9–13 are enlarged details showing the progressive feeding of the can end, formation of the curls, and gauging of the curls and spaces between the edges of the curls and the shoulders of the can end;

Fig. 14 is a perspective view of a can end after it has passed through this apparatus; and Fig. 15 is a partial view showing a part of a counting mechanism.

Figure 5:
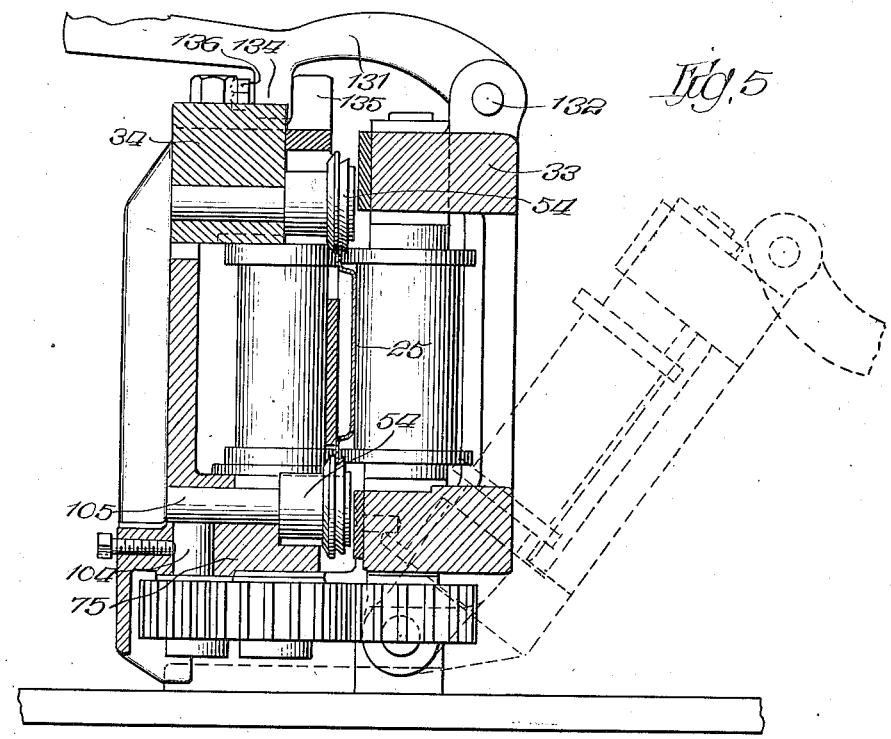
Fig. 5 is an enlarged section taken on the line 5—5 of Fig. 1.

The machine shown on the drawing is adapted to operate upon the usual rectangular sardine can end or closure of commerce, and it is intended that the machine will form upon the opposite longer sides a curl at the flange edge. This will, perhaps, be best understood by viewing Fig. 14, on which reference character 25 indicates the can end, reference character 26 the usual shoulder, and reference character 27 the usual flange. At the edge of the flange and along the longer sides the material is drawn or bent over into curls 28, as will be clearly apparent upon comparing this Fig. 8 upon the same sheet of drawing.

My present invention concerns itself particularly with the arrangement of counting devices in this and other similar machines, this being selected for the purposes of illustration, because it operates upon the can end to perform a final operation; because it provides a machine through which the can ends are moved by the forming parts and for other reasons which will be manifest as the invention is understood.

The apparatus shown on the drawing and of which mention has already been made, will now be described.

A bed 31 is rigidly supported and preferably in inclined position upon legs 32 at the feed end, and legs 33 at the delivery end, which legs may, of course, be individual supports or constitute parts of the machine frame. Mounted upon this bed and extending longitudinally of it is a roll housing 34, to which, or to the bed, is pivoted a companion roll housing 35 at 36, the pivots 36 in the present instance, being shown as indicated in Figs. 3 and 4 as engaged in lugs 37. These housings carry a plurality of sets of rolls for operating upon the can ends in the manner indicated in Figs. 9 to 13.

A can end entering into the operative portion of the machine is engaged first by two rolls 41 and 42 which are merely feeding rolls in the present instance. These rolls have parts 43 of diameter larger than the bodies and are adapted to engage the side flanges 27 of the can end 25 to feed it forward. The can end next encounters a set of rolls 44 and 45 which provide the initial bend in the extremities of the side flanges and these rolls have ends 46 and 47 which provide a bending pass between them to bring the edges of the flange to the angular formation shown in Fig. 10. That is to say, the set of rolls 44 and 45 bend the edges of the flanges to approximately 45 degrees from the plane of the flanges themselves. Leaving the rolls 44 and 45 the can end enters between rolls 48 and 49 and these rolls have ends 51 and 52, defining between them passes of right angle form, so that the part 53 which was bent to the angular position shown in Fig. 10 is by these rolls bent to that shown in Fig. 11. From the rolls 48 and 49, the can end passes curling rolls 54 which curl over the bent up parts 53 of the flanges into the curls 28. From the rolls 54 the can end passes between gauging rolls 55 and 56, having ends 57, one of which rolls, i. e., that to the left viewing Fig. 13, is disposed behind the flange, and that to the right in position to cause the ends 57 to enter in between the edges of the curls 28 and the shoulders 26 of the can ends to gauge the curl and the space between the edge of the curl and the shoulder in order that these spaces may be sufficient to permit the can ends to be assembled readily upon the can bodies and without special fitting. The rolls 55 and 56 act as feeding rolls also and, indeed, this is true of the rolls 44, 45, 48, 49 and 54.

The rolls which operate upon one side of the can end, i. e., are located at one side of the travel of the can end through the machine, are mounted in one of the housings already mentioned and the rolls that operate upon the other side are mounted in the other housing, so that when the housings are separated any can end that may have become distorted or jammed in the apparatus can be easily removed.

Figure 6:
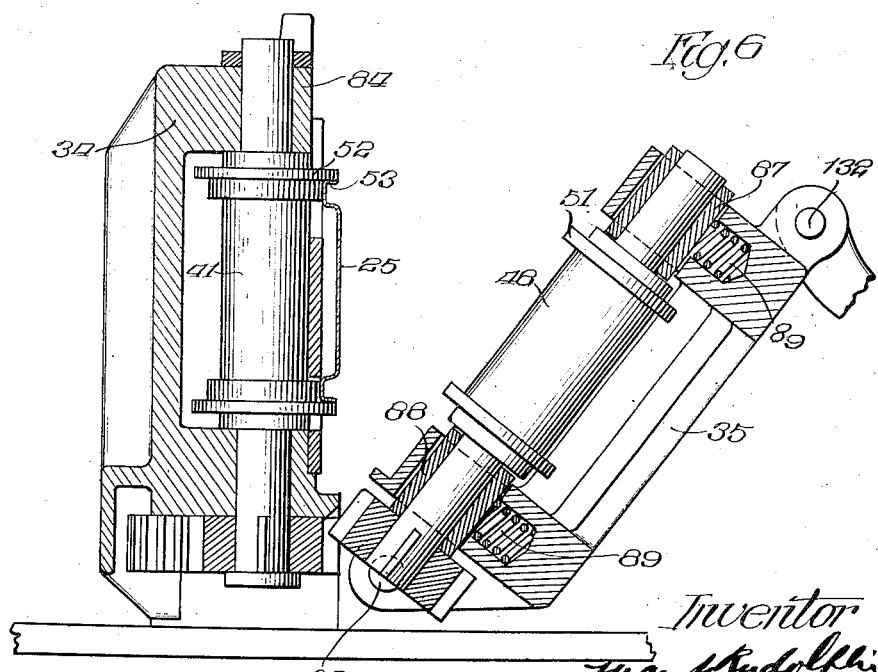
Fig. 6 is a similar view with the parts differently arranged and taken on the line 6—6 of Fig. 1.

All of the rolls except the rolls 54 in the present instance are positively driven and from a common power source. A power shaft 61 (Fig. 2) is mounted in bearings 63 and 64, and upon this shaft are fast and loose pulleys 65 and 66 driven from any suitable source of power. The shaft 61 carries a pinion or gear 67 which meshes with a gear 68 upon a stub shaft 69 having bearing at 71 in the fixed housing 34, and carrying a bevelled pinion 72 within the housing. This pinion is in mesh with a companion pinion 73 fixed on a stub shaft 74 having bearing in a partition 75 which forms the upper wall of the gear case. The stub shaft 74 carries a gear 77 which meshes with a gear 78 upon a shaft extension 79 of roll 56, the gear 78 being located beneath the wall 75. The rolls 42, 45 and 49 also are provided with similar shaft extensions indicated respectively at 81, 82 and 83 and similarly positioned through the wall 75. The upper ends of all these rolls have bearing in the top wall 84 of the housing 34, an example of which is shown in Fig. 6.

The roll 55 is mounted in the housing 35 and has a shaft extension 85 upon which is a gear 86 meshing with the gear 78, so that both of these rolls are positively driven and in opposite directions. The rolls 41, 44 and 48 are all similarly mounted in the housing 35 and in bearings 87, 88, respectively at the top and bottom of the housing. These bearings are spring pressed by springs 89 to cause the rolls to be firmly, but yieldingly held in contact with their companion against the flanges in the several operations. The gear connections 78 and 86 are duplicated as may be seen from viewing Fig. 7 for the three sets of rolls 41—42, 44—45, and 48—49. Shaft extensions 91, 92 and 93 respectively upon rolls 48, 44, 41, carry gears 94, 95 and 96, meshing with companion gears 97, 98 and 99 upon shaft extensions 81, 82 and 83. The gears 78, 97, 98 and 99 are interconnected by gears 101, 102 and 103 which are idlers and are mounted upon stud shafts 104, thus completing the chain of gearing for driving these several sets of rolls. No driving mechanism is provided in the present instance for driving the rolls 54 which impart the curl, these rolls being merely mounted upon horizontally disposed stub shafts 105 in the fixed housing 34, the operative portions of the rolls 54 being located above and beneath the travel of the can end as indicated in Fig. 5.

The can ends, of course, may be fed in between the rolls in any suitable fashion. However, I have shown on the drawing a guiding device comprising a backing plate 111 which extends past all of the rolls and is cut away at its top and bottom at 112 to permit access of the rolls to the can end. Plates 113 are provided at the forward end of this plate to form the other side of the guide and to direct the can ends accurately in between the rolls.

At the delivery end of the machine a mechanism is provided for receiving the ends as they arrive and arranging them in stack formation. The can ends pass along in vertical position and over the shaft 61, which is provided with a feeding spiral of two dimensions, that is to say there is a worm or spiral 121 on the shaft extending from adjacent the can end receiving point to a substantial distance at one side thereof and a second spiral 122 which forms a continuation of the first, but which is of materially larger diameter and brings the can ends to nearly upright position as they are fed forwardly by reason of the rotation of the shaft. The smaller spiral permits the ends to pass into position for stacking at any instant they may arrive at the stacking station. If the spiral is not then in position for an end to enter between the threads it may merely ride thereupon until a recess is presented to receive it. The can ends after they leave the spirals pass into a constantly enlarging receiving and stacking pocket formed by the bed 11 at the bottom, upwardly extending side walls 123 at the sides and a moving arm 124 at the front. This arm is mounted upon a rod 125, carried in brackets 126, from bearings 63 and 64 and is adapted to be moved ahead as the can ends are assembled and as may be seen by comparing Figs. 1 and 8.

The construction just described permits of the accurate stacking of the completed ends and this without requiring accurate timing of the operations of curling with the stacking mechanism. Locking means are provided to hold the housings in operative relation and these locking means in the present instance comprise one or more levers 131, pivoted at 132 on the housing 35 and having a lug 134 adapted to engage behind a companion lug 135 on the housing 34. If desired, a tightening screw 136 may also be provided.

A counting mechanism provided and arranged in accordance with my present invention is preferably mounted upon a mounting 137, extending up from the forward end of the housing 34, and upon this mounting is secured a counting mechanism 140 having a reciprocating crank 138, and connected by a pin and slot connection with a lever 141. This pin and slot connection is indicated at 139. The lever is so constructed and arranged that its free end is disposed in the path of travel of the can ends as they move forward under the action of the rolls themselves. In the present instance the end of this lever is positioned between the feeding rolls 41 and 42, and the initial forming rolls 44 and 45.

It will be noted that the housings may be separated without interfering with the position of the counting mechanism, and that when so arranged the counting mechanism counts the can ends when their formation is nearly completed. It will be manifest also that the counting mechanism is actuated by the pressure of the advancing can ends and this without requiring any conveyer for carrying the can ends past the counting mechanism.

It is thought that the invention and many of its attendant advantages will be understood from the foregoing without further description, and it will be obvious that various changes may be made in the form, construction and arrangement of the parts without departing from the spirit and scope of the invention or sacrificing any of its material advantages, the form hereinbefore described being merely a preferred embodiment thereof.

I claim:

1. In a can end curling mechanism, in combination, a series of pairs of rollers which grasp the can ends and feed them from one pair to another pair of said rollers, flange-bending means operating on the edges of the can ends as they are so fed, and can end counting means having an operating element which is at a point in the edgewise path of the can ends and is engaged by the edges of can ends while they are tightly grasped and being moved by a pair of said rollers.

2. In an apparatus for performing a forming operation on can ends, and having cooperating parts for said purpose mounted in a separable housing divided on a vertical plane, one of the housing elements being swingable laterally, a counting mechanism having a movable actuating part extending into the space between the housing elements and in the path of the can ends.

3. In an apparatus having gauging means for gauging the curl of a can end, housing means for the same divided on a vertical plane, one of the housing elements being outwardly movable, a can end counting mechanism combined with said housing means and having an arm extending within the housing and arranged in the plane traversed by the can ends, and means for propelling the can ends edgewise through said housing.

4. A flanging machine for curling the flanges of rectangular can ends comprising a mechanism for curling the edges of the flanges and a stacking mechanism for stacking the can ends as they come from said curling mechanism, and means for counting said ends as they pass through said curling mechanism, said counting means having an arm arranged in the edgewise path of the can ends.

5. A flanging machine for curling the flanges of rectangular can ends comprising a mechanism for curling the edges of the flanges and a stacking mechanism for stacking the can ends as they come from said curling mechanism, and a counting mechanism having an arm arranged in the edgewise path of the can ends for counting the ends prior to their arrangement in stack formation.

6. A flanging machine for curling the flanges of rectangular can ends comprising curling and stacking mechanisms through both of which the can ends move uninterruptedly and a counting mechanism having an arm arranged in the edgewise path of the can ends for counting the can ends during such movement.

7. A can end flanging machine for curling the flanges of cans comprising rolls for curling said flanges, means for gauging the curl formed by said rolls, and a feeding spiral which receives the curled can ends from the last rolls and removes them laterally and stacks them on edge.

8. A can end flanging machine for curling the flanges of cans comprising rolls for curling said flanges, rolls for gauging the curl formed by said first mentioned rolls, and a feeding spiral which receives the curled can ends from the last rolls and removes them laterally and stacks them on edge.

9. A can end flanging machine for curling the flanges of cans comprising rolls for curling said flanges, other rolls for simultaneously feeding the can ends and gauging the curl formation, and a feeding spiral which receives the curled can ends from the last rolls and removes them laterally and stacks them on edge.

FRANK RUDOLPHI.